Oct. 25, 1966     N. T. SIMOPOULOS ET AL     3,281,861
OSCILLOSCOPES
Filed Dec. 31, 1963     2 Sheets-Sheet 1
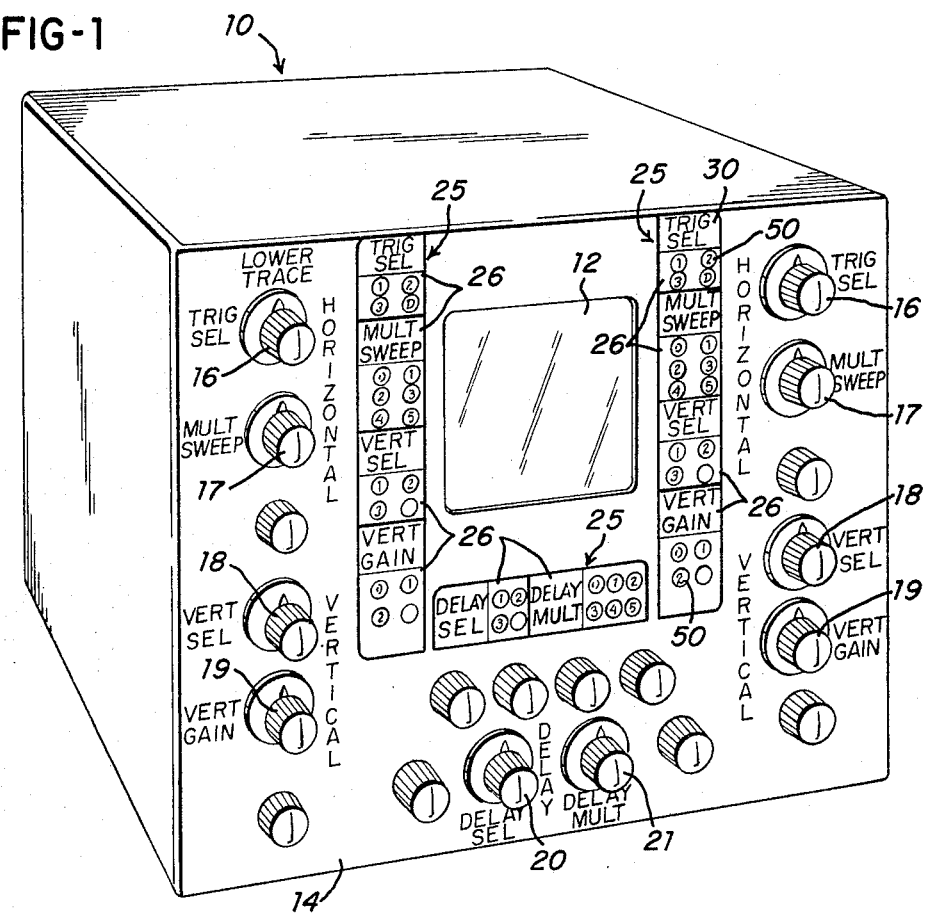
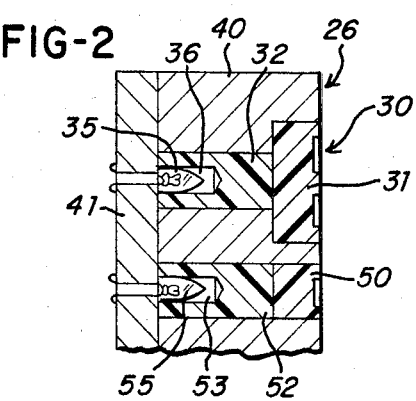
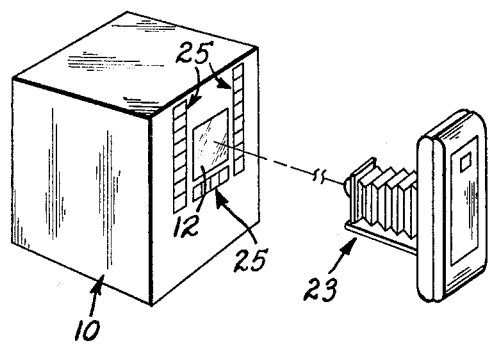
INVENTORS
NICHOLAS T. SIMOPOULOS &
JAMES D. HOEFFEL
BY
Marechal, Biebel, French & Bugg
ATTORNEYS

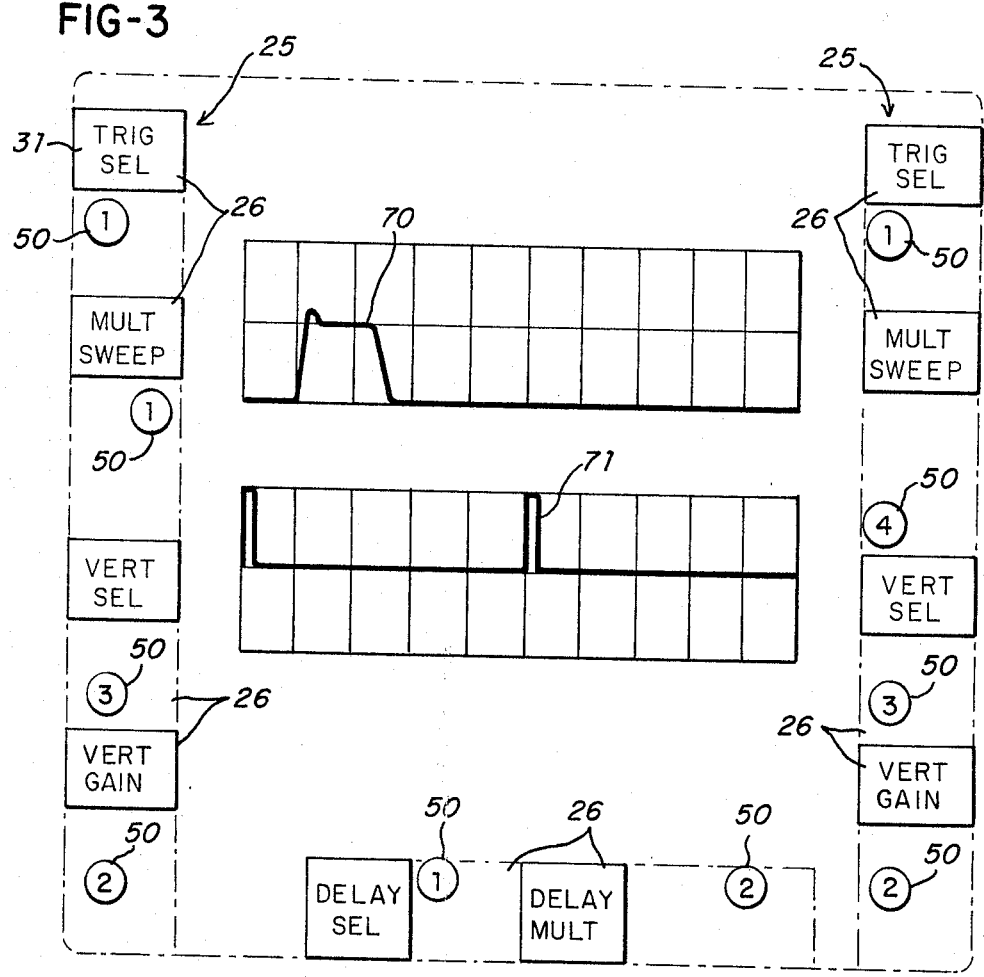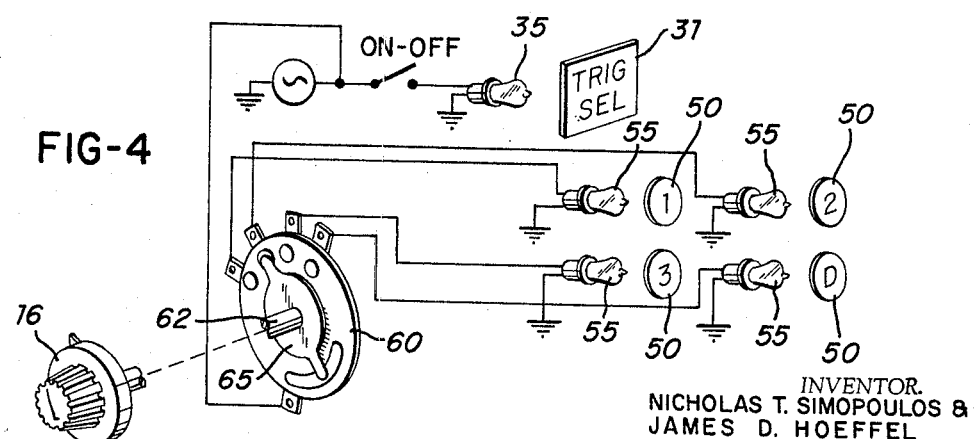

United States Patent Office 3,281,861
Patented Oct. 25, 1966

3,281,861
OSCILLOSCOPES
Nicholas T. Simopoulos and James D. Hoeffel, Dayton, Ohio, assignors to Dayton Electronic Products Company, Dayton, Ohio, a corporation of Ohio
Filed Dec. 31, 1963, Ser. No. 334,783
2 Claims. (Cl. 346—110)

This invention pertains to oscilloscopes and related cathode ray tube display apparatus, and more particularly to such apparatus for displaying a visual or recordable presentation of the settings of the control switches which affect or otherwise control the trace or image.

In oscilloscopes, and particularly in recording oscilloscopes and oscillographs, there are a number of input parameters and switch settings which affect the trace or image on the scope. Thus, when the trace is photographed or otherwise recorded for subsequent analysis, it has been necessary for the operator separately to record certain auxiliary or additional data, including the positions of the oscilloscope controls and switches so that the photograph could subsequently be analyzed in relation to these settings. Thus, the operator often recorded such additional data on separate sheets, and the analyist consulted these additional sheets which he correlated with each of the photographs. In airborne equipment or in instances where the photographs of the traces are to be analyzed at a later time, the procedure of separately recording the settings and controls on the oscilloscope is both time consuming and conductive in the introduction of errors.

The apparatus of this invention includes provision for the display of actual switch positions directly on the front panel of the oscilloscope, and preferably adjacent to the face of the CRT tube, so that the displayed data may be included in a photograph made of the tube face. Preferably, the display of the switch positions includes a plurality of separately controllable or illuminated indicators, there being preferably the one indicator for each separate switch position of each switch the position of which is to be recorded. Further, there is preferably provision for a luminous or illuminated block for identifying each of these switches, the positions of which are displayed by the oscilloscope.

It is therefore a primary object of this invention to provide a cathode ray tube display device having provision for displaying, along with the trace on the scope, the positions of the switches or other electrical controls affecting the trace.

A further object of this invention is the provision of a recording oscilloscope which has switch position information positioned next adjacent to the face of the cathode ray tube for inclusion in a photograph of the tube face.

A further object of this invention is the provision of an oscilloscope wherein the switches which control the trace or image control the illumination of corresponding discrete portions of a data block according to the switch positions.

Another object of this invention is the provision of an oscilloscope including a separately controllable light for each of a plurality of switch positions with the light of each switch position being grouped according to each switch adjacent to a border of the CRT tube face, and each of the lights in the group being connected so that only one light of each group is illuminated and represents the position of the associated switch.

These and other objects and advantages of the invention will be apparent from the following description, the accompanying drawings and the appended claims.

In the drawings:

FIG. 1 is a perspective view of a dual trace pulse analyzer oscilloscope constructed according to this invention;

FIG. 2 is a fragmentary vertical section taken through the data block;

FIG. 3 represents a typical photograph of the display of the oscilloscope of FIG. 1;

FIG. 4 shows the electrical connections of one of the control switches and the associated indicator lights; and FIG. 5 is a perspective diagrammatic view of the oscilloscope of this invention and a camera to photograph the CRT tube display.

Referring to the figures of the drawings which represent a preferred embodiment of the invention, a dual trace oscilloscope for pulse analysis is shown at 10 in FIG. 1 as including for example, a dual-beam cathode ray tube 12. Such an oscilloscope has the usual vertical deflection and linear sweep generator channels, and the associated switches and controls for such channels. Thus, the oscilloscope 10 may have on the front panel 14 a trigger selected switch 16, a multiplier sweep switch 17, a vertical selector switch 18, and a vertical gain switch 19. In common with each of the channels there may be provided a delay selector switch 20 and a delay multiplier switch 21. Also, the unit includes the usual potentiometer or slide wire controls, such as for level, intensity, and focus. The oscilloscope 10 may also have a support or frame (not shown) for the attachment or mounting of a recording camera 23 (FIG. 5) on the front panel thereof to photograph the face of the tube 12.

The positions of each of the switch controls 16–21 affect in one manner or another the trace or image on the CRT tube 12. Therefore, knowledge of the positions of these controls is important in interpreting a photograph of the traces on the scope.

Means for providing a visual or a recordable presentation of the positions of each of the switches 16–21 includes a data block indicated generally at 25 which is positioned on the front panel 14 adjacent to the sides and the bottom of the face of the tube 12. The data block 25 is preferably divided into groups 26, there being a separate group 26 for each of the switches 16–21.

A vertical section of a fragment of one of the data block groups 26 is shown in FIG. 2. The group 26 includes a switch identification portion 30 which may consist of a block 31 of translucent material, such as Lucite. Behind the block 31 is a Lucite rod 32. A miniature "grain of wheat" electrical lamp 35 is set into a rearwardly or inwardly opening recess 36 formed in the rod 32. The rod 32 and block 31 are preferably received and retained in a holder strip 40, and closed on the back by a plate 41 with the face of the block 31 held substantially flush with the front panel 14.

Means for identifying one of the switches may be formed on the front surface of the block 31, such as by engraved letters cut into the outer surface, so that these letters glow in relation to the remainder of the block when the light 35 is energized. Preferably, the identification blocks 31 corresponding to switches 16–21 are constantly illuminated during the times which the oscilloscope is turned on.

In each of the groups 26, the associated switch positions are represented by an individually energized switch position indicator block 50 arranged immediately adjacent the switch identification block 31. The block 50 may be formed as a part of or an extension of a rod 52. A recess 53 similar to the recess 36 is formed in the rod 52 and receives a miniature light 55. The blocker or rod 50 is suitably formed at the end thereof with suitable indicia representing, either by numbers, letters, or other suitable means, one of the selectable positions of the associated switch. Accordingly, there is one block 50 capable of being selectably illuminated for each of the selectable switch positions, in each of the groups 26, and in the example shown, four rods 50 are rectangularly arranged in the holder strip 40 for the four selectable positions of the "trigger selector" switch 16.

The individual light 55 associated with the blocks 50 are preferably selectively energized directly from a wafer or extension on the associated switch. By way of example, the trigger selector switch 16 is shown in FIG. 4 as including a wafer 60 on the switch shaft 62. The rotor 65 of the switch is shown in the "2" position, and in this position energizes the light 55 in the associated position. The data block 31 is sohown as being illuminated concurrently with the on-off control of the oscilloscope.

The operation of the invention may be more clearly understood by reference to FIG. 3, which illustrates a typical photograph of a display on an oscilloscope constructed according to this invention. The dual traces 70 and 71 are seen together with the illuminated blocks 50, there being one block 50 illuminated for each of the several switches 16–21, representing the actual switch positions at the time that the photograph was made. The data block 25 is preferably positioned adjacent to the CRT presentation so as to be included as a marginal portion of the photograph of the screen. Accordingly, a permanent record is made of the settings of these controls at the time that the photograph is made of the trace on the cathode ray tube, eliminating the necessity for separably recording the switch settings involved.

The illuminated data block 25 has the further advantage of making unnecessary individual markings for the associated switches, since the operator, in setting the controls, has a clear and ready reference to the switch positions according to the visual presentation in the data block 25. This therefore results in an uncluttered control panel, and simplifies the operation of the oscilloscope.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:
1. An oscilloscope having an improved control panel associated with a cathode ray tube and being adapted so that a photograph of the portion of the panel including the face of the cathode ray tube provides a convenient and quick visual indication of a plurality of oscilloscope control settings, comprising:
   means defining an opening in said panel for exposing the face of the cathode ray tube,
   a series of oscilloscope control switches arranged in a predetermined order generally in a row on said panel,
   each of said control switches having a plurality of selectable positions corresponding to different input settings for said oscilloscope,
   a series of groups of individual indicators with said group corresponding in number to said switches and arranged in a row generally opposite said switches and adjacent the face of said cathode ray tube in the same order as said switches,
   the indicators in each of said groups corresponding in number to the number of selectable positions of its associated control switch,
   a separate light source for each of said indicators, and
   means connecting each said light source to its associated control switch so that the illumination of any given indicator designates a corresponding setting of its said associated control switch.

2. The oscilloscope as defined in claim 1 in which said group of indicators and corresponding rows of switches are arranged in two vertical rows positioned on opposite sides of said opening, and each of said indicators including a block of translucent material with said associated light source positioned adjacent said corresponding block for transmitting the light therefrom to the face of said block.

References Cited by the Examiner
UNITED STATES PATENTS

| | | | |
|---|---|---|---|
| 2,446,674 | 8/1948 | Sproul | 178—7.84 |
| 2,633,403 | 3/1953 | Spaulding | 346—110 |
| 2,665,343 | 1/1954 | Benson | 200—167 X |
| 2,815,438 | 12/1957 | Abell | 240—1.3 |
| 2,936,449 | 5/1960 | Kinckiner | 178—7.84 |

LOUIS J. CAPOZI, *Primary Examiner.*

LEO MILOW, *Examiner.*

JOSEPH W. HARTARY, *Assistant Examiner.*